(12) United States Patent
Borsa (10) Patent No.: US 7,779,653 B2
(45) Date of Patent: Aug. 24, 2010

(54) OXYGEN ENRICHED ROTARY FIBERIZATION

(75) Inventor: Alessandro G. Borsa, Evergreen, CO (US)

(73) Assignee: Johns Manville, Denver, CO (US)

( * ) Notice: Subject to any disclaimer, the term of this patent is extended or adjusted under 35 U.S.C. 154(b) by 836 days.

(21) Appl. No.: 11/651,654

(22) Filed: Jan. 10, 2007

(65) Prior Publication Data
US 2007/0261447 A1 Nov. 15, 2007

Related U.S. Application Data (63) Continuation-in-part of application No. 11/430,459, filed on May 9, 2006.

(51) Int. Cl.
C03B 37/04 (2006.01)

(52) U.S. Cl. .............. 65/460; 65/466; 65/455; 65/456; 65/459

(58) Field of Classification Search .......... 65/455, 65/456, 459, 460, 469, 470
See application file for complete search history.

(56) References Cited

U.S. PATENT DOCUMENTS

| | | | |
|---|---|---|---|
| 3,084,525 A | 4/1963 | Levecque et al. | |
| 3,254,977 A | 6/1966 | Levecque et al. | |
| 3,304,164 A | 2/1967 | Charpentier et al. | |
| 3,395,005 A | 7/1968 | Stelmah | |
| 3,523,774 A | 8/1970 | Kleist | |
| 3,785,791 A | 1/1974 | Perry | |
| 3,867,119 A | 2/1975 | Kasuga et al. | |
| 3,928,009 A | 12/1975 | Perry | |
| 4,153,455 A | 5/1979 | Eiselstein et al. | |
| 4,197,103 A | 4/1980 | Ishikawa et al. | |
| 4,229,198 A | 10/1980 | Coggin, Jr. et al. | |
| 4,246,017 A | 1/1981 | Phillips | |
| 4,392,878 A | 7/1983 | Okuma et al. | |
| 4,392,879 A | 7/1983 | Takeuchi et al. | |
| 4,532,105 A | 7/1985 | Kunioka et al. | |
| 4,548,632 A * | 10/1985 | Tanaka et al. | ........... 65/468 |
| 4,698,083 A | 10/1987 | Shioura et al. | |
| 4,759,784 A | 7/1988 | Shono et al. | |
| 5,017,205 A | 5/1991 | Shioura et al. | |
| 5,139,551 A | 8/1992 | Yamatsuta et al. | |
| 5,154,746 A | 10/1992 | Okuma et al. | |
| 5,176,729 A | 1/1993 | Bernard et al. | |
| 5,277,706 A | 1/1994 | Blandin et al. | |
| 5,314,521 A | 5/1994 | Lewis et al. | |
| 5,326,241 A | 7/1994 | Rook et al. | |
| 5,364,431 A | 11/1994 | Lewis et al. | |

(Continued)

FOREIGN PATENT DOCUMENTS

GB 2144115 2/1985

(Continued)

*Primary Examiner*—Queenie Dehghan
(74) *Attorney, Agent, or Firm*—Robert D. Touslee (57) ABSTRACT

A method of reducing carbon monoxide and hydrocarbon emissions in a rotary glass fiberization process utilizes a fiberizing spinner with fiberizing holes through which molten glass is passed by centrifugal force to form primary fibers which pass through an annular heat bath region and attenuation fluid emitting apparatus that forcefully emits an attenuating fluid to attenuate the primary fibers into finer diameter fibers. Oxygen is introduced into the annular heat bath region to oxygen enrich the annular heat bath region and is combusted in the annular heat bath region to materially reduce carbon monoxide and unburned hydrocarbon emissions produced by the process.

14 Claims, 4 Drawing Sheets

U.S. PATENT DOCUMENTS

| | | | |
|---|---|---|---|
| 5,462,571 | A | 10/1995 | Taguchi et al. |
| 5,601,628 | A | 2/1997 | Battigelli et al. |
| 5,660,798 | A | 8/1997 | Doshi et al. |
| 5,688,302 | A | 11/1997 | Snyder |
| 5,785,996 | A | 7/1998 | Snyder |
| 5,900,037 | A | 5/1999 | Yang et al. |
| 6,158,249 | A | 12/2000 | Battigelli et al. |
| 6,543,258 | B1 | 4/2003 | Konno et al. |
| 6,596,048 | B1 | 7/2003 | Tuffal et al. |
| 6,615,616 | B2 | 9/2003 | Konno et al. |
| 6,862,901 | B1 | 3/2005 | Otaki et al. |
| 2003/0196458 | A1* | 10/2003 | Bennett ....................... 65/377 |
| 2004/0112093 | A1* | 6/2004 | Beaufils et al. ............... 65/456 |
| 2005/0098670 | A1* | 5/2005 | Lasalle et al. ............ 241/261.2 |

FOREIGN PATENT DOCUMENTS

| | | |
|---|---|---|
| WO | WO 01/19741 | 3/2001 |
| WO | WO 03/078340 | 9/2003 |
| WO | WO 2004/101459 | 11/2004 |

\* cited by examiner

FIG-4

OXYGEN ENRICHED ROTARY FIBERIZATION

This patent application is a continuation-in-part of patent application Ser. No. 11/430,459 filed on May 9, 2006.

BACKGROUND OF THE INVENTION

The subject invention relates to a method of reducing the creation of pollutants in a rotary glass fiberization process and, in particular, to a method of utilizing oxygen enriched combustion to materially reduce carbon monoxide and hydrocarbon emissions in a rotary glass fiberization process while producing a fibrous product with the rotary glass fiberization process that has substantially the same or improved thermal insulating properties. While the method of the subject invention can be utilized to good advantage in a rotary glass fiberization process that has an external burner with a combustion chamber heating an annular heat bath region external of the process fiberizing spinner, the method of the subject invention is especially well suited for reducing carbon monoxide and hydrocarbon emissions in a rotary glass fiberization process which utilizes an external burner wherein the combustion of the fuel mixture takes place external of the burner to heat an annular heat bath region external of the fiberizing spinner and/or in a rotary glass fiberization process, with fuel spill over from within the fiberizing spinner, which combusts the unburned fuel provided from within the fiberizing spinner to heat an annular heat bath region external of the fiberizing spinner with or without an external burner. In addition to the reduction of carbon monoxide and hydrocarbon emissions in a rotary glass fiberization process, where the rotary glass fiberization process utilizes an external burner with a combustion chamber, the method of the subject invention can also be used to both reduce the size of the burner's combustion chamber and reduce the total amount of fuel consumed by the external burner.

SUMMARY OF THE INVENTION

The subject invention relates to a method of utilizing oxygen enriched combustion to materially reduce carbon monoxide and hydrocarbon emissions in a rotary glass fiberization process while producing a fibrous product with the rotary glass fiberization process that has substantially the same or improved thermal insulating properties. Where even a relatively small reduction in carbon monoxide and/or hydrocarbon emissions (e.g. reductions of 1%, 5%, 10%, etc.) in a rotary glass fiberization process can determine whether or not federal, state, and/or local regulatory emission standards, guidelines, or mandates are met by the process, the utilization of method of the subject invention is an important process tool. In rotary glass fiberization tests, the method of the subject invention reduced carbon monoxide emissions by amounts ranging from about 30% to about 60% by weight.

In a rotary fiberization process utilizing the method of the subject invention, molten glass is fiberized by passing the molten glass through fiberizing holes in a rapidly rotating fiberizing spinner to form primary fibers that pass through an annular heat bath region external of the fiberizing spinner and an attenuation fluid emitting apparatus that forcefully emits an attenuating fluid to attenuate the primary fibers into finer diameter fibers. Oxygen is introduced into the annular heat bath region to oxygen enrich the annular heat bath region and is combusted in the annular heat bath region. The oxygen is typically introduced into the annular heat bath region from an oxygen-emitting manifold (from an oxygen source that, by volume, is predominantly oxygen [contains more oxygen than any other ingredient], preferably at least 50% oxygen, more preferably at least 90% oxygen, and most preferably at least 95% oxygen and/or by utilizing an oxygen rich fuel mixture in an external burner. The oxygen enriched combustion, which takes place in the annular heat bath region, results in higher combustion temperatures in the heat bath region that more rapidly burn carbon monoxide in the heat bath region to convert the carbon monoxide in the heat bath region to carbon dioxide and more rapidly burns other hydrocarbons in the heat bath region to thereby materially reduce the carbon monoxide and unburned hydrocarbon emissions produced by the process. The higher combustion temperatures in the heat bath region also reduce primary fiber viscosity, in a portion of the annular heat bath region where the primary fibers are introduced into the annular attenuation region of the process, to facilitate the attenuation of the primary fibers into lesser diameter fibers in the annular attenuation region. In the annular attenuation region of the process, the primary fibers are subjected to high rates of shear that attenuate the primary glass fibers into the lesser diameter fibers so that fibrous products made by the process of the subject invention typically exhibit thermal insulating properties substantially equal to or better than fibrous products made by the rotary glass fiberization process without the oxygen enrichment. In addition to the reduction of carbon monoxide and hydrocarbon emissions in a rotary glass fiberization process while producing a fibrous product with the rotary glass fiberization process that has substantially the same or improved thermal insulating properties, where the rotary glass fiberization process utilizes an external burner with a combustion chamber, the method of the subject invention can also be used to both reduce the size of the burner's combustion chamber and reduce the total amount of fuel consumed by the external burner.

BRIEF DESCRIPTION OF THE DRAWINGS

FIGS. 1 and 2 schematically illustrate the direction of flow of combustion gases, oxygen introduction, attenuating fluids, fiber dispersion fluids, and binder fluids.

FIG. 4 schematically illustrates the direction of flow of combustion gases, oxygen introduction, attenuating fluids, fiber dispersion fluids, and binder fluids.

DETAILED DESCRIPTION OF THE INVENTION

Figure 1:
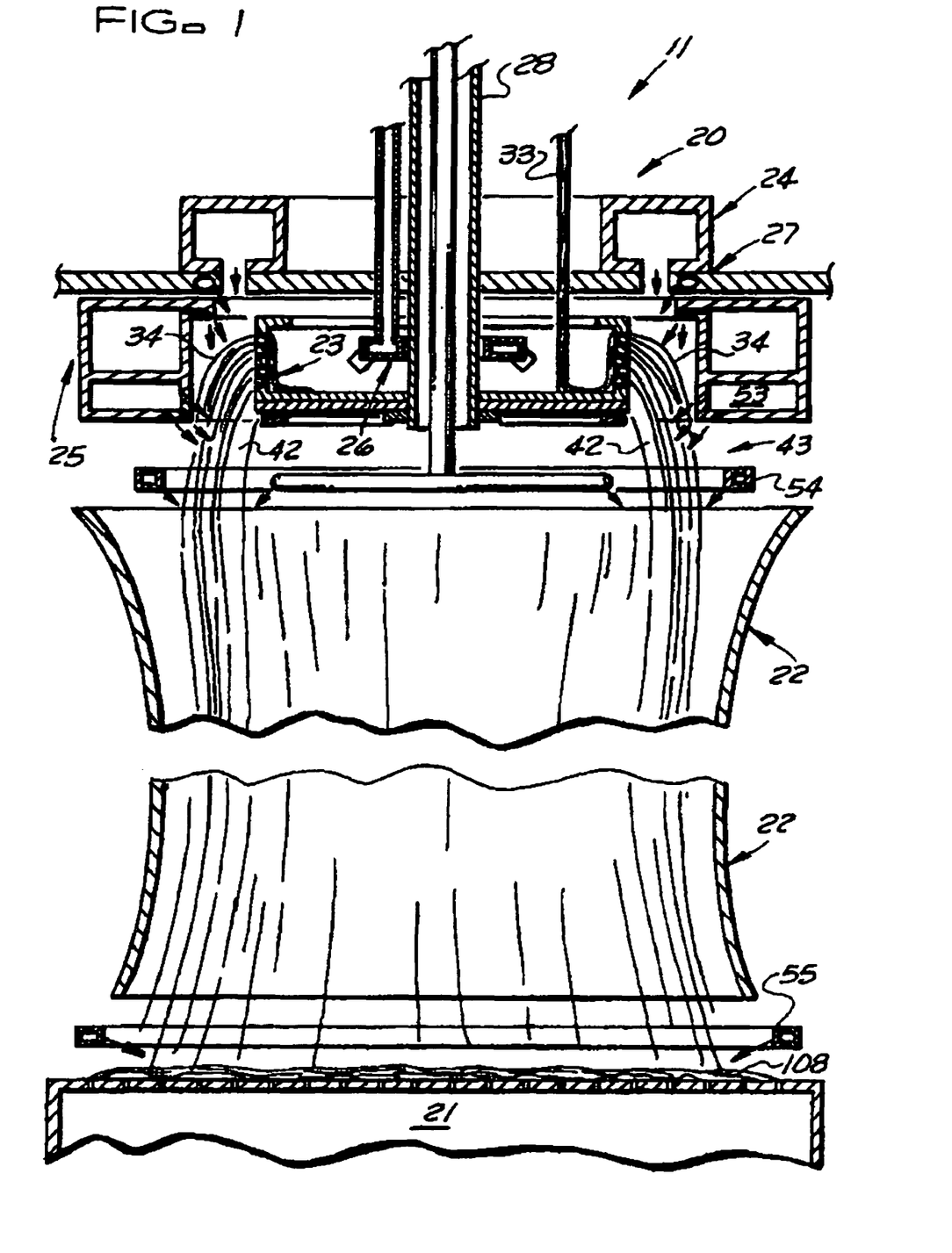
FIG. 1 is a schematic transverse vertical cross section through a glass fiberizing and mat collection station that may be used in the method of the subject invention and that includes a rotary glass fiberizing apparatus with an external burner having a combustion chamber, a binder application assembly, a collection tube, and a portion of a rotary collection drum for collecting a glass fiber mat.
Figure 2:
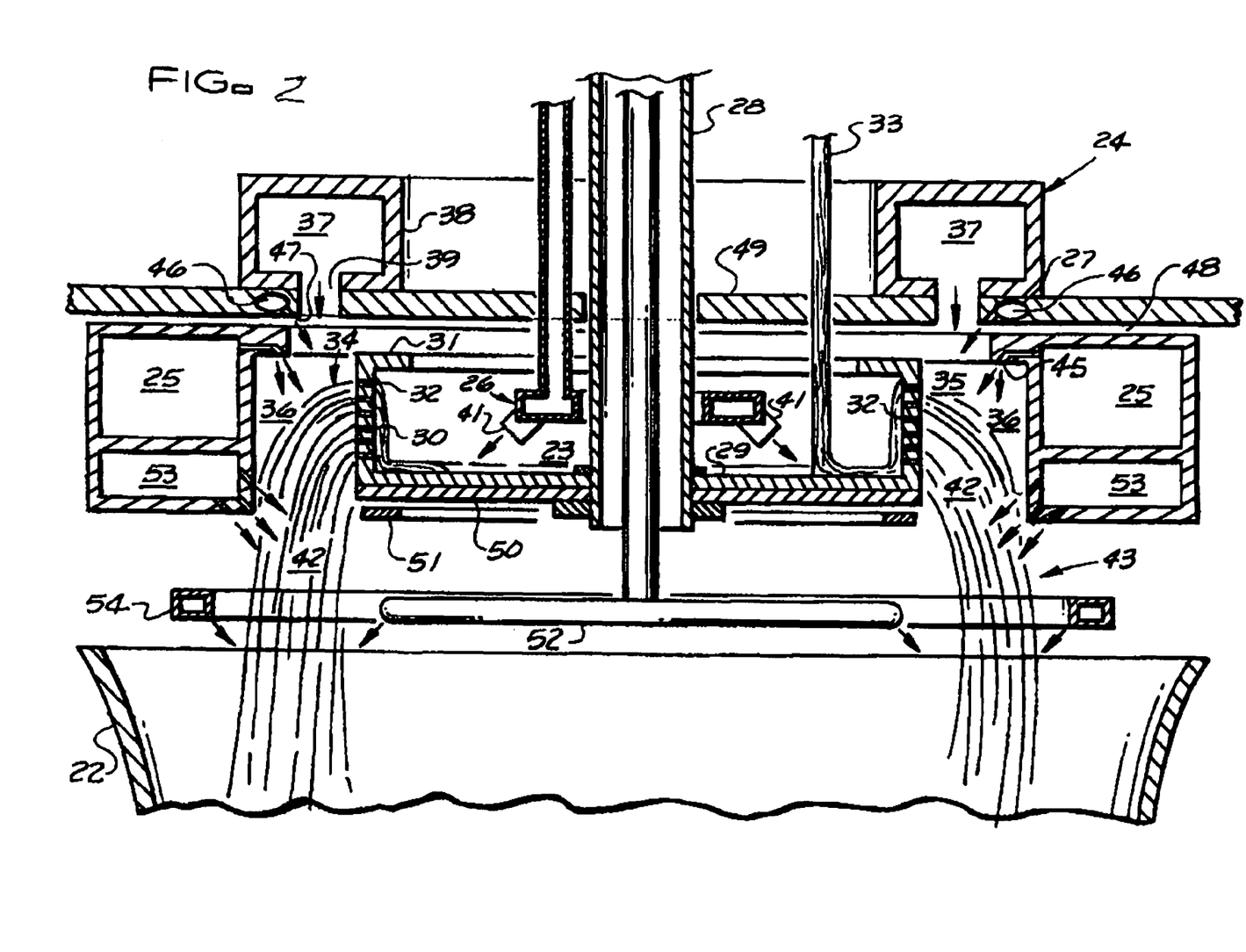
FIG. 2 is a schematic vertical cross section, on a larger scale than FIG. 1, of the rotary fiberizing apparatus of FIG. 1.

FIGS. 1 and 2 show a glass fiberizing and mat collection station 11 that may be used to carry out the method of subject invention. The method of the subject invention utilizes the introduction of oxygen (from an oxygen source that, by volume, is predominantly oxygen [contains more oxygen than any other ingredient], preferably at least 50% oxygen, more preferably at least 90% oxygen, and most preferably at least 95% oxygen and/or from an oxygen rich burner fuel mixture) into an annular heat bath region of the process to oxygen enrich the region and thereby effect a relatively high localized temperature increase in an annular heat bath region external of a fiberizing spinner; reduce the formation of carbon monoxide emissions by the fiberizing process; and/or reduce the formation of unburned hydrocarbon emissions by the fiberizing process. The primary fibers produced by the process are directly introduced into an annular fluid attenuation region, from the annular heat bath region, where the primary fibers are subjected to high rates of shear that attenuate the primary glass fibers into the lesser diameter glass fibers.

As shown in FIGS. 1 and 2, the glass fiberizing and mat collection station 11 includes a rotary fiberizing apparatus 20, a rotary perforated mat collection drum 21, and a forming tube 22 through which the fibers formed by the rotary fiberizing apparatus 20 pass to be collected on the rotary mat collection drum 21. The rotary fiberizing apparatus 20 includes a fiberizing spinner 23, an external burner 24 with a combustion chamber, a fiber attenuation apparatus 25, an internal burner or burners 26, and an oxygen injection apparatus 27.

Figure 5:
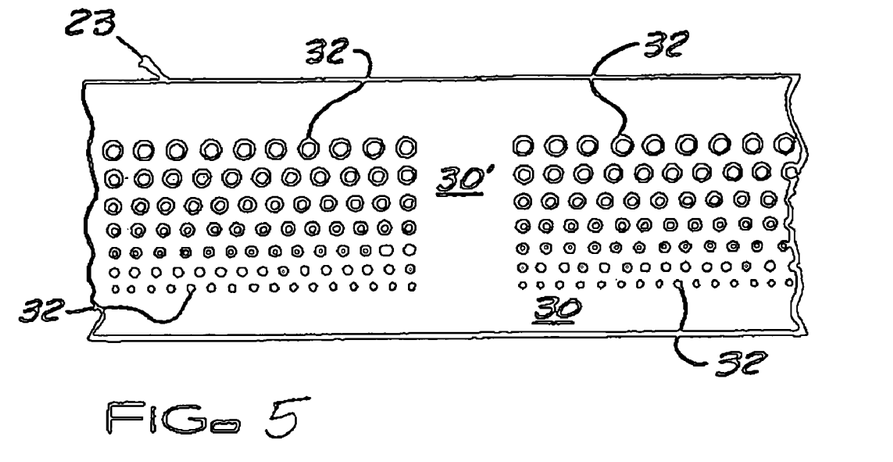
FIG. 5 is a partial side view of the sidewall of the fiberizing spinner of FIGS. 1, 2, and 4, schematically representing a preferred fiberizing hole and reinforcing band arrangement for the fiberizing spinner.

The fiberizing spinner 23 of the rotary fiberizing apparatus is mounted on the lower end of a hollow drive shaft 28, which is driven by a conventional drive assembly (not shown) to rapidly rotate the fiberizing spinner 23 about a vertical axis. The fiberizing spinner 23 has a disc shaped base plate 29 affixed to the hollow drive shaft 28, an integral annular peripheral sidewall 30 extending upward from an outer peripheral edge portion of the base plate 29, and an integral annular reinforcing flange 31 extending radially inward from an upper edge portion of the sidewall 30. The annular peripheral sidewall 30 has an upper annular edge portion that is free of fiberizing holes, a lower annular edge portion that is free of fiberizing holes, and a mid-portion extending between the upper and lower annular edge portions with thousands of fiberizing holes 32. The fiberizing holes 32 in the mid-portion of the annular sidewall 30 are typically between 0.016 and 0.035 inches in diameter. Preferably, as schematically shown in FIG. 5, an upper region of the mid-portion of the annular fiberizing spinner sidewall 30 has larger diameter fiberizing holes 32 than a lower region of the mid-portion of the annular sidewall and fewer fiberizing holes 32 per unit area than the lower region of the mid-portion of the annular sidewall to facilitate the formation of primary fibers 34 across the height of the mid-portion having diameters in a narrower diameter range. In addition, to strengthen the fiberizing spinner sidewall 30 and increase fiberizing spinner service life, the fiberizing spinner sidewall 30 is provided with a plurality of circumferentially spaced apart reinforcing bands 30' that extend through the mid-portion of the sidewall from the upper to lower annular edge portions of the sidewall. These reinforcing bands 30' are solid (do not contain fiberizing holes 32), and uninterrupted throughout their heights from the upper to the lower annular edge portions of the sidewall 30.

A stream of molten glass 33 (from a furnace source not shown) is introduced into an interior of the fiberizing spinner 23 and onto the base plate 29 of the fiberizing spinner radially inward of the annular fiberizing spinner sidewall 30 at a rate that is typically between 120 pounds per hour and 900 pounds per hour. Lower molten glass throughputs are used when making thin glass fiber mats such as those used to fabricate smaller outside diameter, thin walled, pieces of tubular pipe insulation. Higher molten glass throughputs are used when making thick glass fiber mats such as but not limited to those used to fabricate larger outside diameter, thick walled, pieces of tubular pipe insulation and residential, commercial and industrial building insulation. To reduce raw material costs, less expensive glass compositions can be used in the process of the subject invention than those normally used in rotary glass fiberization operations. However, the molten glass 33 of these less expensive glass compositions has a viscosity of at least 1000 poise at about 1900° F. and typically, a viscosity of at least 1000 poise at 1950° F. and a glass liquidus of about 1620° F. or greater up to about 1690° F. The use of these glass compositions, which are more viscous than the glass compositions normally used in other rotary fiberizing operations to produce products such as but not limited to residential insulation, introduces issues into the fiberization process that are addressed by the process of the subject invention, such as but not limited to, minimizing any increased energy requirements for drawing this more viscous glass into fibers and maintaining a desired glass throughput per fiberizing hole while not raising operating temperatures to the extent that the spinner alloy is adversely affected to materially reduce spinner service life.

The fiberizing spinner 23 is rotated about its generally vertical axis of rotation at speeds that centrifuge the molten glass 33 through the fiberizing holes 32 in the annular fiberizing spinner sidewall 31 to form primary glass fibers 34 and to pass the primary fibers through an annular heat bath region 35 into an annular fluid attenuation region 36. Preferably the molten glass 33 is centrifuged through the fiberizing holes 32 with a force between 900 and 1300 G's (where G is the "gravitational constant" $3.44 \times 10^{-8}$ ft$^4$/lbf-sec$^4$ or $6.672 \times 10^{-11}$ N·m$^2$/kg$^2$) and at an average rate that is between 0.015 and 0.060 pounds per hour per fiberizing hole 32 and typically between about 0.04 and about 0.05 pounds per hour per fiberizing hole 32.

The annular heat bath region 35 includes and extends in height from at least the upper edge portion down through at least the mid-portion of the annular fiberizing spinner sidewall 30 and radially outward from the outer surface of the fiberizing spinner sidewall 30 to the annular fluid attenuation region 36. The annular external burner 24 heats the annular heat bath region 35 and is located immediately above the annular heat bath region 35. The annular external burner 24 heats the annular heat bath region 35 with relatively low momentum, high temperature (e.g. above 2100° F.) gases of combustion that are introduced from above into the annular heat bath region 35 to provide a net heat flux into the primary glass fibers 34 passing from the fiberizing spinner 23 fiberizing holes through the annular heat bath region 35 into the annular attenuation fluid region 36. By having a net heat flux into the primary glass fibers 34 passing through the annular heat bath region 35, the viscosity of the primary glass fibers 34 is reduced during their passage through the annular heat bath region 35 and the introduction of these reduced viscosity primary fibers 34 into the annular fluid attenuation region 36 enables a greater attenuation or elongation of the primary glass fibers 34 into lesser diameter fibers in the annular fluid attenuation region 36.

The use of relatively low momentum gases of combustion to heat the annular heat bath region 35, reduces the degree of fiber entanglement of adjacent primary glass fibers 34 in the annular heat bath region 35 and decreases the formation of unwanted "shot" or fine glass debris from the primary glass fibers 34 in the annular heat bath region to thereby improve the cleanliness and quality of the glass fibers and the mat formed from the glass fibers produced by the subject invention. The momentum of the gases of combustion in the annular heat bath region 35 are controlled to reduce glass fiber networking as the primary glass fibers 34 pass through the annular heat bath region 35 so that in combination with the other fiber network reduction measures used in the process of the subject invention, a glass fiber mat can be produced by the subject invention for making pipe insulation that separates as required in the cross machine direction to form mat sections having relatively straight feathered leading and trailing edges that extend perpendicular to or substantially perpendicular to the machine direction of the mat and are without or substantially without stringers that extend beyond the edges for more than four inches and typically the edges are without stringers that extend beyond the edges for more than three inches.

Figure 3:
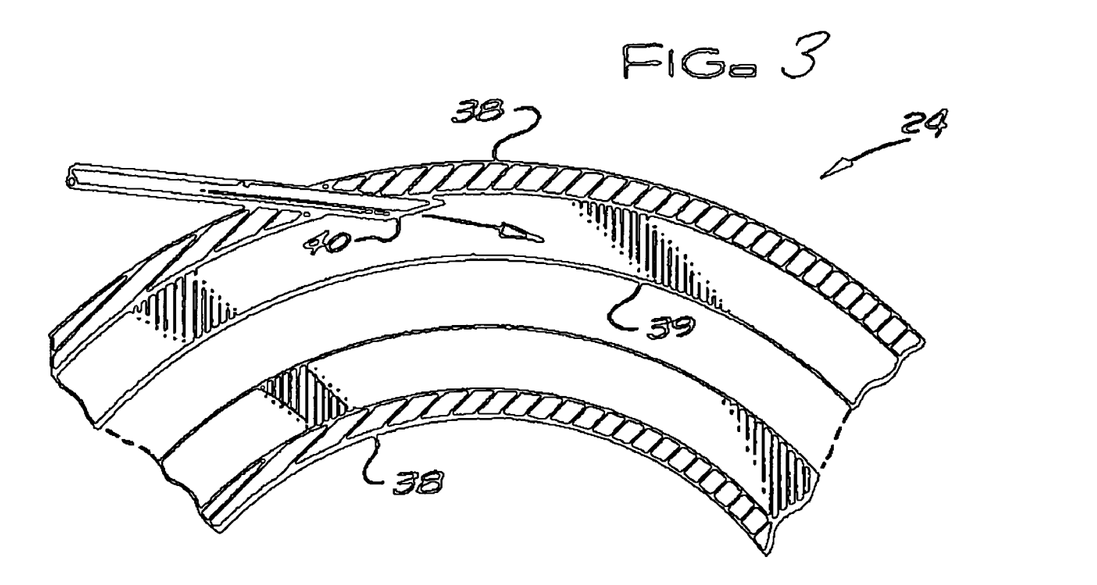
FIG. 3 is a schematic partial horizontal cross section, viewed from above, of the combustion chamber of the annular external combustion burner of the fiberizing apparatus of FIGS. 1 and 2.

As shown, the annular external burner 24 has an annular combustion chamber 37 that is lined with a high temperature resistant refractory lining 38. The annular combustion chamber 37 is sized to permit expansion of the gases of combustion within the chamber and prior to the discharge of the gases of combustion from the exterior burner 24 through the annular discharge orifice 39 to reduce the momentum of the gases of combustion discharged through the annular discharge orifice 39. The high temperature resistant refractory lining 38 of the external burner 24 reduces energy loss from the external burner 24 into the fiberizer frame structure (not shown) and creates an interior combustion chamber surface which envelops the combustion space of the burner to provide a radiant high temperature surface that facilitates combustion of the premixed fuel mixture introduced into the chamber and the maximum practical thermal extraction of energy from the gases of combustion produced in the chamber for use in the fiberizing process. The annular discharge orifice 39 is a relatively wide annular discharge orifice 39 that is located above and extends radially outward from the outside surface of the fiberizing spinner sidewall 30. Preferably, the premixed fuel mixture is injected into the combustion chamber 37 of the external burner 24 through an inlet port or ports 40 (such as shown in FIG. 3) so that the premixed fuel mixture has a circumferential circulation pattern within the combustion chamber 37 where the premixed fuel mixture is burned to form the gases of combustion. These gases of combustion are then discharged downward into the annular heat bath region 35 through the relatively wide annular discharge orifice 39. Preferably, the relatively wide annular discharge orifice 39 is sufficiently wide, radially, to ensure that the primary glass fibers 34 are bathed in the low momentum, high temperature gases of combustion discharged from the external burner 24 for the entire or substantially the entire radial distance of their passage from the fiberizing spinner sidewall 30 to the annular fluid attenuation region 36.

To introduce more heat into a region above the fiberizing spinner 23 and into the annular heat bath region 35 as well as heat the interior of the fiberizing spinner 23, a fuel mixture having less oxygen than required for full combustion of the fuel within the fiberizing spinner, can be introduced into the interior of the fiberizing spinner 23 through one or more internal burners 41. Typically, the fuel mixture would be an air deficient (compared to the stoichiometric ratio) natural gas mixture where the ratios range between 5:1 and 12:1. The higher ratios would be used for lower pull rates where it is more difficult to maintain a sufficiently high disc temperature for good fiberization. Typically, the flow rates and fuel mixture ratios used by the different internal burners 41 would differ depending on where the different burners are located and the directions in which the different burners are aimed. Typically, the internal burners 41 would not be refractory lined. However, in specific locations one or more of the small internal burners 41 could be refractory lined to maximize, to the extent practical, the thermal energy extracted for the process at strategic location(s). The internal burners 41 would each operate at low flow rates that would generally be lower than 2000 scfh (2000 standard cubic feet per hour) and as low as 500 scfh (500 standard cubic feet per hour). The combustion of this fuel mixture within the fiberizing spinner 23 heats the interior of the fiberizing spinner to keep the molten glass 33 within the fiberizing spinner at a sufficiently high temperature for good fiberization and the fuel that does not burn within the fiberizing spinner 23 spills out over the upper peripheral reinforcing flange 31 of the fiberizing spinner where it combusts to add heat to a region over and adjacent the fiberizing spinner including the annular heat bath region 35.

The annular fluid attenuation region 36 is spaced radially outward from the fiberizing spinner sidewall 30 and extends in height at least from the upper edge portion down through at least the mid-portion of the annular fiberizing spinner sidewall. An attenuation fluid is forcefully emitted from above into the annular fluid attenuation region 36. The forcefully emitted attenuation fluid attenuates the primary glass fibers 34 introduced into the annular fluid attenuation region 36 from the heat bath region 35 into lesser diameter glass fibers 42. While the lesser diameter glass fibers 42 typically have diameters between 5 microns and 8 microns and for certain applications have diameters between about 6 and about 7 microns, the lesser diameter glass fibers could be formed to have diameters in ranges below 5 microns or above 7 microns. The forcefully emitted attenuation fluid also directs those lesser diameter glass fibers 42 downward away from the fiberizing spinner 23 toward the rotary collection drum 21 in a generally tubular veil 43 of the lesser diameter glass fibers 32 and fiber networks formed from a portion of the lesser diameter glass fibers 32.

The forcefully emitted attenuation fluid is emitted in a generally downward direction at a relatively high velocity from above into the annular fluid attenuation region 36. Preferably, the forcefully emitted attenuation fluid is emitted from an annular fiber attenuation apparatus 25 having a continuous annular slit, a series of annularly spaced-apart discrete jets, or a series of annularly spaced-apart slits (semi continuous slits) 45. The forcefully emitted attenuation fluid can be emitted into the annular fluid attenuation region 36 in a variety of patterns and angles to provide the final force for pulling and attenuating the still-molten primary glass fibers 34 into the lesser diameter glass fibers 42, which have diameters that are greatly reduced from the diameters of the primary glass fibers 34. The attenuating fluid is typically air. However, other attenuating fluids such as but not limited to steam could be used to attenuate the primary glass fibers 34 in the annular fluid attenuation region.

Where the annular fiber attenuation apparatus 25, forcefully emits the attenuation fluid downward into the annular attenuation region 36 in a variety of patterns and/or angles to provide the final force for pulling and attenuating the still-molten primary glass fibers 34 into the lesser diameter glass fibers 42, the flow of the forcefully emitted attenuation fluid in the patterns and angles imparted by the jets or slits can be used to disperse the lesser diameter glass fibers and decrease the otherwise high concentration of the lesser diameter glass fibers 42 in the generally tubular veil 43 of lesser diameter glass fibers. If the lesser diameter glass fibers 42, which are otherwise in extremely close proximity to each other, are not dispersed by spreading the fibers generally radially inward or outward (fiber dispersion) from the generally tubular fiber veil 43 with the forcefully emitted attenuation fluid and/or other fiber dispersing means discussed below, the high concentration of the lesser diameter glass fibers 42 in the generally tubular fiber veil 43 will entangle and accumulate into ever larger and longer fiber networks. If permitted to form, these larger and longer fiber networks are collected along with the lesser diameter glass fibers 42 to form a less uniform glass fiber mat that, when pulled apart to form mat sections later, e.g. in a pipe insulation process, does not readily separate into mat sections with leading and trailing feathered edges that are substantially straight (regular) with no or substantially no fibrous stringers extending beyond the feathered edges of the mat a distance greater than about three to four inches.

In the method of the subject invention, oxygen from a source other than an oxygen rich burner fuel mixture (such as but not limited to a pressurized oxygen/nitrogen mixture from a manifold which, by volume, is predominantly oxygen [contains more oxygen than any other ingredient], preferably at least 50% oxygen, more preferably at least 90% oxygen, and most preferably at least 95% oxygen) and/or from an oxygen rich burner fuel mixture is/are introduced into and combusted in the annular heat bath region 35. The oxygen introduced into the annular heat bath region by the method of the subject invention oxygen enriches the annular heat bath region and thereby effect a relatively high localized temperature increase in a portion of the annular heat bath region 35 where the primary fibers are introduced from the heat bath region into the annular fluid attenuation region 36 and subjected to high rates of shear that attenuate the primary glass fibers 34 into the lesser diameter glass fibers 42; reduce the formation of carbon monoxide emissions by the fiberizing process; and/or reduce the formation of unburned hydrocarbon emissions by the fiberizing process. In a first embodiment of the method of the subject invention, the oxygen is introduced or injected into the annular heat bath region 35 from an annular oxygen supply manifold 46 having a continuous annular slit, a series of annularly spaced-apart discrete jets, or a series of annularly spaced-apart slits (semi continuous slits) 47. In a second embodiment of the method of the subject invention, the oxygen is introduced into the annular heat bath region 35 from the combustion chamber 37 of the annular external burner 24 by utilizing an oxygen rich fuel mixture in the annular external burner 24. The oxygen of the oxygen rich fuel mixture is not fully combusted within the combustion chamber 37 of annular external burner 24 whereby, along with the products of combustion from the combustion chamber 37 unburned oxygen is introduced from the combustion chamber 37 into the annular heat bath region 35. In a third embodiment of the method of the subject invention, the oxygen is introduced into the annular heat bath region 35 from both the annular oxygen supply manifold 46 and the combustion chamber 37 of the annular external burner 24. Due to flame spread limitations and the auto ignition potential of an oxygen rich fuel mixture, the total amount of unburned oxygen that can be introduced into the heat bath region 35 from the annular external burner 24 is limited and the introduction of oxygen from the annular oxygen supply manifold 46, which is not limited by such considerations, is preferred. However, where an oxygen rich fuel mixture is used to introduce oxygen into the heat bath region 35 from the external burner 24, the use of an oxygen rich fuel mixture in the external burner 24 enables a reduction in both the size of the burner's combustion chamber 37 and the total amount of fuel consumed by the external burner.

Preferably, there is an adjustable annular air gap 48 between the annular oxygen supply manifold 46 and the annular attenuation apparatus 25 through which a selected volume of air is drawn into the heat bath region 35 and attenuation region 36 to promote combustion within these regions.

The rotary fiberizing apparatus 20 has a fiberizing and attenuation region where the molten glass 33 is introduced into the fiberizing spinner 23 and passes through the fiberizing holes 32 in the fiberizing spinner sidewall 30 to be fiberized into the primary glass fibers 34 and where the primary glass fibers thus formed are attenuated into the lesser diameter glass fibers 42. The fiberizing spinner 23; the annular external burner 34 which is above, overlaps, and extends radially outward from the fiberizing spinner 23; the annular attenuation apparatus 25 which is located radially outward from the fiberizing spinner 23 and extends from above a plane containing the upper surface of the reinforcing flange 31 of the fiberizing spinner downward to a height substantially coinciding with or below a horizontal plane containing the base plate 29 of the fiberizing spinner 29; and the annular oxygen supply manifold 46 which is located intermediate and extends, except for a narrow annular air gap 48, between the external burner 34 and the attenuation apparatus 25, all function as a mechanical barrier to enclose and contain energy in the fiberizing and attenuation region of the process to maintain this region within a desired temperature range to facilitate the fiberization of the molten glass 33 while conserving energy. Preferably, to further enclose this fiberizing and attenuation region and maintain this region within a desired temperature range while conserving energy, a high temperature resistant radiant or refractory insulating plate 49 is located immediately above the fiberizing spinner 23. The radiant or refractory insulating plate 49 extends from the hollow drive shaft 28 radially outward beyond the fiberizing spinner 23, has a central opening through which the hollow drive shaft 28 for the fiberizing spinner passes, and a second opening, located radially outward from the central opening, through the stream of molten glass 33 passes from the source of molten glass onto the base plate 29 of the fiberizing spinner 23. The annular oxygen supply manifold 46 can be contained within the refractory plate 49.

To further contain energy in and/or add energy to the fiberizing spinner 23 in the fiberizing and attenuation region of the process to maintain this region within a desired temperature range to facilitate fiberization of the molten glass 33, a high temperature resistant, refractory insulator plate or radiant insulator plate 50 can be secured to the bottom surface of the fiberizing spinner base plate 29 to contain heat within the fiberizing spinner 23 and/or the fiberizing spinner base plate 29 can be heated by an annular induction heater 51. Preferably, the refractory insulating plate 50 is substantially coextensive with the bottom surface of the fiberizing spinner base plate 29. Preferably, the annular induction heater 51 is located immediately below and adjacent the outer peripheral edge portion of the bottom surface of the fiberizing spinner base plate 29 to input energy into this portion of the fiberizing spinner base plate 29. The overall energy balance of this fiberizing and attenuation region can also be facilitated by introducing of the stream of molten glass 33 onto the fiberizing spinner base plate 29 radially outward from the center of the fiberizing spinner and as close as practical to the fiberizing spinner sidewall 30 to minimize the area of the fiberizing spinner base plate 29 that is wetted by the molten glass 33.

As discussed above, preferably, the lesser diameter glass fibers 42 of the tubular fiber veil 43 are dispersed inwardly and/or outwardly in generally radial directions by forcefully applying fluid onto the veil. This generally radial dispersion of the lesser diameter glass fibers 42 in the tubular fiber veil 43 reduces the formation of larger and long fiber networks from the lesser diameter glass fibers that can form stringers in the mat collected on the perforated rotary collection drum 21 and cause that mat to be less uniform in density. As discussed above in connection with the attenuation apparatus 25, this dispersion of the lesser diameter glass fibers 42 can be accomplished, at least in part, by forcefully emitting the attenuating fluid from the attenuating apparatus 25 into the annular fluid attenuation region 36 at alternating angles and/or in a non-uniform pattern. This general dispersion of the lesser diameter glass fibers 42 in the tubular fiber veil 43 can also be accomplished, at least in part, by forcefully applying a binder and/or other fluid to the lesser diameter glass fibers 42 of the tubular fiber veil 43 from within and/or outside of the tubular fiber veil at a location or locations beneath the annular fluid attenuation region 36. Furthermore, all of these methods of fiber dispersion can be utilized together to obtain the desired amount dispersion of lesser diameter glass fibers 42 and can be combined with the use of a forming tube 22 specifically configured to effect fiber dispersion.

Where binder(s) and/or other fluid(s) are forcefully applied to the tubular fiber veil 43 from within the veil, the binder(s) and/or other fluid(s) are typically applied to the tubular fiber veil 43 by an interior fluid application apparatus 52 that is located beneath the fiberizing spinner 23 and either above or in the upper portion of the forming tube 22. The binder(s) and/or other fluid(s) that are applied to the veil 43 from within the veil are supplied under pressure to the interior fluid application apparatus 52 through the hollow drive shaft 28. To apply binder(s) to and/or disperse the lesser diameter glass fibers 42, the interior fluid application apparatus 52 forcefully emits the binder(s) and/or other fluid(s) outward toward the interior of the tubular fiber veil 43 from one or more series of annularly arranged jets (such as liquid pressure or air-atomized binder nozzles commonly used in the industry), one or more annular slits, and/or one or more series of annularly arranged spaced apart slits of the application apparatus 52. Preferably, the binder(s) and/or other fluid(s) forcefully emitted by the application apparatus 52 are applied to the lesser diameter glass fibers 42 of the tubular fiber veil 43 by introducing the binder(s) and/or other fluids into the tubular fiber veil 43 along the entire or substantially entire inner circumference of the tubular fiber veil. The impact of the fluid(s) emitted by the fluid application apparatus 52 on the lesser diameter glass fibers 42 of the tubular fiber veil 43 disperses the lesser diameter glass fibers 42 of the tubular fiber veil 43 in generally outward directions from the veil and where the fluid(s) are binder(s) applies the binder(s) to the fibers.

Where binder(s) and/or other fluid(s) are forcefully applied to the tubular fiber veil 43 from outside of the veil, the binder(s) and/or other fluid(s) are typically applied to the tubular fiber veil 43 by one or more exterior fluid application apparatuses that are located to forcefully emit fluids on and into the veil 43 at a level or levels beneath the fiberizing spinner 23 and either above or in the upper portion of the forming tube 22. FIGS. 1 and 2 show an embodiment of the invention that utilizes a first exterior fluid application apparatus 53 that is integral with and located immediately beneath the annular attenuation apparatus 25 and a second exterior fluid application apparatus 54 that is located between the first exterior fluid application apparatus 53 and the forming tube 22. The binder(s) and/or other fluid(s) are supplied under pressure to the exterior fluid application apparatuses 53 and 54. To apply binder(s) to and/or disperse the lesser diameter glass fibers 42 of the veil, the exterior fluid application apparatuses 53 and 54 forcefully emit the binder(s) and/or other fluid(s) inward toward the exterior of the tubular fiber veil 43 from one or more series of annularly arranged jets (such as liquid pressure or air-atomized binder nozzles commonly used in the industry), one or more annular slits, and/or one or more series of annularly arranged spaced apart slits of the application apparatuses 53 and 54. Preferably, the binder(s) and/or other fluid (s) forcefully emitted by the application apparatuses 53 and 54 are applied to the lesser diameter glass fibers 42 of the tubular fiber veil 43 by introducing the binder(s) and/or other fluids into the tubular fiber veil 43 along the entire or substantially entire outer circumference of the tubular fiber veil. The impact of the fluid(s) emitted by the fluid application apparatuses 53 and 54 on the lesser diameter glass fibers 42 of the tubular fiber veil 43 disperses the lesser diameter glass fibers 42 of the tubular fiber veil 43 in generally inward directions from the veil and where the fluid(s) are binder(s) applies the binder(s) to the fibers. It is contemplated that any one of the individual application apparatuses 52, 53, and 54 can be used alone or that two or more of the application apparatuses 52, 53, and 54 can be used together in various combinations.

Binder(s) can also be applied to the tubular fiber veil 43 from outside of the veil by one or more exterior fluid application apparatuses that are located to forcefully emit fluids on and into the veil at a level or levels between the lower end of the forming tube 22 and the perforated rotary collection drum 21 or in the lower portion of the forming tube 22. FIG. 1 shows an embodiment of the invention that utilizes an exterior fluid application apparatus 55 that is located between the lower end of the forming tube 22 and the perforated rotary collection drum. The binder(s) and/or other fluid(s) are supplied under pressure to the exterior fluid application apparatus 55. To apply binder(s) to the lesser diameter glass fibers 42 of the veil, the exterior fluid application apparatus 55 forcefully emits the binder(s) inward toward the exterior of the tubular fiber veil 43 from one or more series of annularly arranged jets (such as liquid pressure or air-atomized binder nozzles commonly used in the industry), one or more annular slits, and/or one or more series of annularly arranged spaced apart slits of the application apparatus 55. Preferably, the binder(s) forcefully emitted by the application apparatus 55 are applied to the lesser diameter glass fibers 42 of the tubular fiber veil 43 by introducing the binder(s) into the tubular fiber veil 43 along the entire or substantially entire outer circumference of the tubular fiber veil.

The forming tube 22 has an annular horizontal cross section, typically a generally circular horizontal cross section, for its entire or substantially its entire height. The forming tube 22 extends for the greater part of the distance between the rotary fiberizing apparatus 20 and the perforated rotary collection drum 21 and typically extends for substantially the entire distance between the rotary fiberizing apparatus 20 and the perforated rotary collection drum 21. The forming tube 22 functions to contain the tubular fiber veil 43 and to reduce the accumulation of the lesser diameter glass fibers 42 on the exterior fluid application apparatuses 53, 54, and 55. In addition, the forming tube 22 can be configured to slow the velocity and/or descent of the lesser diameter glass fibers 42 in the tubular fiber veil 43 or otherwise control the movement of the lesser diameter glass fibers in the tubular veil as the lesser diameter glass fibers pass from the rotary fiberizing apparatus 20 to the perforated rotary collection drum 21. This fiber control is used to reduce the formation of fiber networks in the fiber veil 43, improve fiber collection on the perforated rotary collection drum 21, and improve mat quality by enabling the collection of a mat 108 on the collection surface of the perforated rotary collection drum 21 that is more uniform in thickness and density throughout and contains fewer and shorter fiber networks. By way of example, this fiber control may be carried out by an appropriate selection of: a) the horizontal cross sectional area or areas of the forming tube 22 at its upper inlet end, upper portion, mid-portion, lower portion, and/or lower outlet end, b) the height (length) of the forming tube, c) the spacing between the upper end of the forming tube and the bottom of the rotary fiberizing apparatus, and/or d) the spacing between the lower end of the forming tube and the collection surface of the rotary collection drum 21. The horizontal cross sectional areas of the forming tube 22 used to control fiber movement in the fiber veil 43 may include variations in the horizontal cross sectional areas along the height of the forming tube to form diverging and converging sections along the height of the forming tube, e.g. a forming tube that has upper and lower diverging portions that are joined by a converging mid-portion. Fiber movement in the fiber veil 43 is typically controlled to slow the velocity and descent of the lesser diameter glass fibers toward the perforated rotary collection drum: a) to provide more time for purposely changing the trajectory of the fibers and fiber networks of the veil and thereby enable a better dispersion of the fibers and fiber networks in the veil by the various fiber dispersion apparatus or apparatuses used in the process and a reduction in the size and length of fiber networks formed in the veil; b) to require less collection airflow down through the perforations of the rotary collection drum 21 to collect and retain the fibers and fiber networks of the veil on the collection surface of the rotary collection drum 21; c) to pass the fibers and fiber networks of the veil more slowly past the binder application apparatus or apparatuses to improve the application of binder to the fibers and fiber networks; and d) to ensure that the veil is made sufficiently turbulent to generate a more even or uniform collection of the fibers and fiber networks of the veil on the collection surface of the perforated rotary collection drum 21 for improved mat quality. While a perforated rotary collection drum 21 is a preferred collection surface for collecting the insulation mat 108, the collection surface for collecting the insulation mat 108 could also be formed by a continuous perforated conveyor belt or other collection surface (not shown).

The lesser diameter glass fibers are collected on a collection surface of the rotary collection drum 21 into an insulation mat 108. An insulation mat 108 made by the method of the subject invention exhibits thermal insulating properties substantially equal to or better than fibrous products made by the rotary glass fiberization process without the oxygen enrichment.

Figure 4:
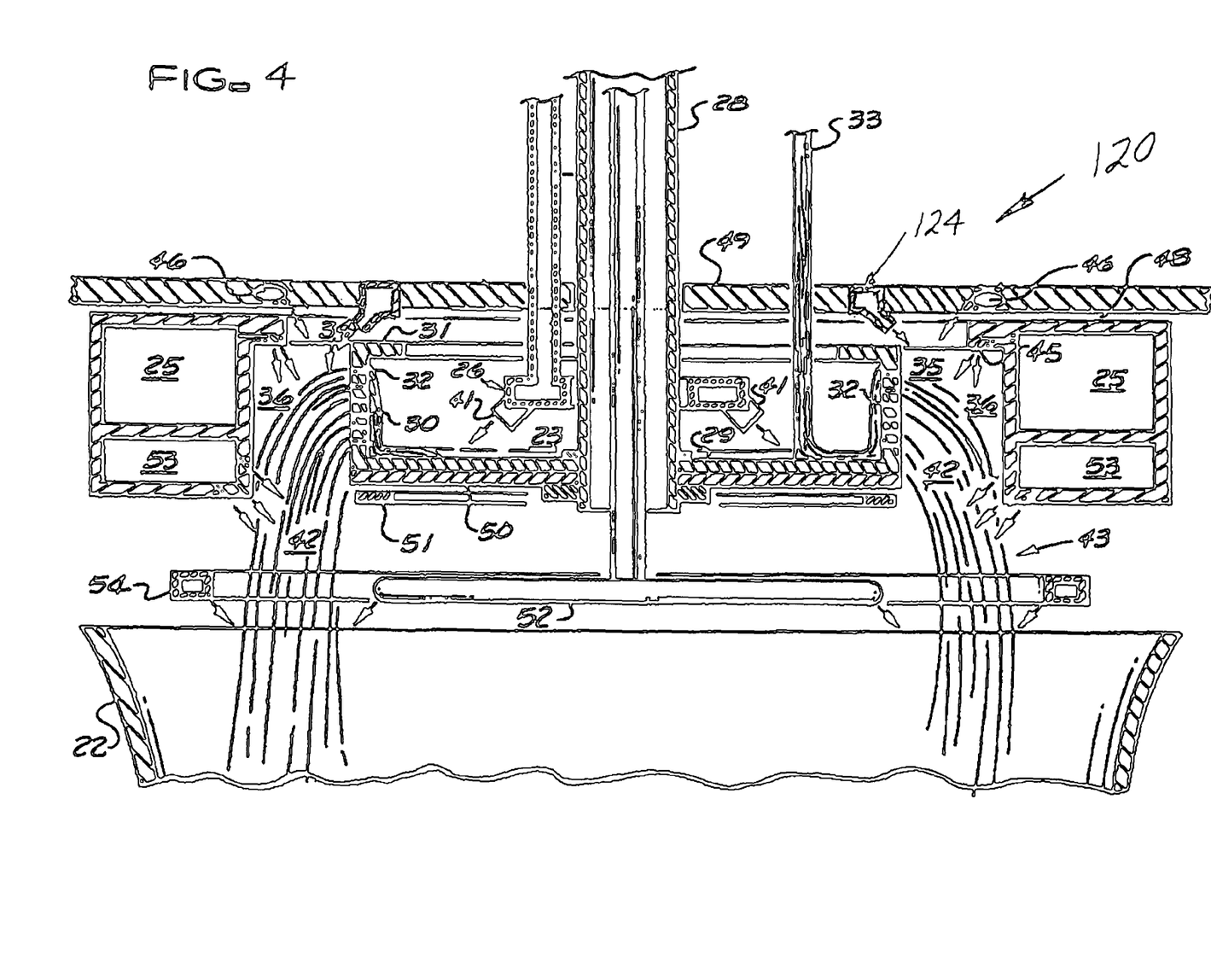
FIG. 4 is a schematic transverse vertical cross section, on a larger scale than FIG. 1, through a rotary glass fiberizing apparatus, which may be substituted in the glass fiberizing and collection station of FIG. 1, for the rotary glass fiberizing apparatus shown FIGS. 1 and 2 and used in the method of the subject invention. This glass fiberizing apparatus includes an external burner without a combustion chamber.

FIG. 4 shows a rotary glass fiberizing apparatus 120 that can be substituted in the glass fiberizing and mat collection station 11 of FIGS. 1 and 2 for the rotary glass fiberizing apparatus 20 and used to carry out the method of subject invention. Since, other than the use of an annular external burner 124 without a combustion chamber, the rotary glass fiberizing apparatus 120 is the same as the rotary glass fiberizing apparatus 20, the same reference numerals will be used in FIG. 4 as are used in FIGS. 1 and 2 to designate like components and the description of the components and their functions, already described above, will not be repeated, except to ensure a clear understanding of method of the subject invention as applied to the rotary glass fiberizing apparatus 120.

The rotary fiberizing apparatus 120 includes a fiberizing spinner 23, an external burner 124 without a combustion chamber, a fiber attenuation apparatus 25, an internal burner or burners 26, and an oxygen injection apparatus 27. In the rotary glass fiberizing apparatus 120, the oxygen is introduced into the annular heat bath region 35 to oxygen enrich the region 35 and thereby effect a relatively high localized temperature increase in an annular heat bath region external of a fiberizing spinner; reduce the formation of carbon monoxide emissions by the fiberizing process; and/or reduce the formation of unburned hydrocarbon emissions by the fiberizing process. The primary fibers produced by the process are directly introduced into an annular fluid attenuation region, from the annular heat bath region, where the primary fibers are subjected to high rates of shear that attenuate the primary glass fibers into the lesser diameter glass fibers.

With the annular external burner 124, the burner fuel mixture is combusted externally of the burner and introduced into the annular heat bath region to heat the annular heat bath region. To introduce more heat into a region above the fiberizing spinner 23 and into the annular heat bath region 35 as well as heat the interior of the fiberizing spinner 23, a fuel mixture having less oxygen than required for full combustion of the fuel within the fiberizing spinner, can be introduced into the interior of the fiberizing spinner 23 through one or more internal burners 41. Typically, the fuel mixture would be an air deficient (compared to the stoichiometric ratio) natural gas mixture where the ratios range between 5:1 and 12:1. The higher ratios would be used for lower pull rates where it is more difficult to maintain a sufficiently high disc temperature for good fiberization. Typically, the flow rates and fuel mixture ratios used by the different internal burners 41 would differ depending on where the different burners are located and the directions in which the different burners are aimed. Typically, the internal burners 41 would not be refractory lined. However, in specific locations one or more of the small internal burners 41 could be refractory lined to maximize, to the extent practical, the thermal energy extracted for the process at strategic location(s). The internal burners 41 would each operate at low flow rates that would generally be lower than 2000 scfh (2000 standard cubic feet per hour) and as low as 500 scfh (500 standard cubic feet per hour). The combustion of this fuel mixture within the fiberizing spinner 23 heats the interior of the fiberizing spinner to keep the molten glass 33 within the fiberizing spinner at a sufficiently high temperature for good fiberization and the fuel that does not burn within the fiberizing spinner 23 spills out over the upper peripheral reinforcing flange 31 of the fiberizing spinner where it combusts to add heat to a region over and adjacent the fiberizing spinner including the annular heat bath region 35.

In the method of the subject invention, as applied to the rotary glass fiberizing apparatus 120 of FIG. 4, oxygen from a source other than an oxygen rich burner fuel mixture (such as but not limited to a pressurized oxygen/nitrogen mixture from a manifold which, by volume, is predominantly oxygen [contains more oxygen than any other ingredient], preferably at least 50% oxygen, more preferably at least 90% oxygen, and most preferably at least 95% oxygen) is introduced into and combusted in the annular heat bath region 35. The oxygen introduced into the annular heat bath region 35 by the method of the subject invention oxygen enriches the annular heat bath region and thereby effect a relatively high localized temperature increase in a portion of the annular heat bath region 35 where the primary fibers are introduced from the heat bath region into the annular fluid attenuation region 36 and subjected to high rates of shear that attenuate the primary glass fibers 34 into the lesser diameter glass fibers 42; reduce the formation of carbon monoxide emissions by the fiberizing process; and/or reduce the formation of unburned hydrocarbon emissions by the fiberizing process. With the rotary glass fiberizing apparatus 120, the oxygen is introduced or injected into the annular heat bath region 35 from an annular oxygen supply manifold 46 having a continuous annular slit, a series of annularly spaced-apart discrete jets, or a series of annularly spaced-apart slits (semi continuous slits) 47.

In describing the invention, certain embodiments have been used to illustrate the invention and the practices thereof. However, the invention is not limited to these specific embodiments as other embodiments and modifications within the spirit of the invention will readily occur to those skilled in the art on reading this specification. For example, a rotary fiberizing apparatus, which utilizes fuel spill over from the interior of the fiberizing spinner 23 to heat the annular heat bath region (unburned fuel from within the fiberizing spinner that spills over the upper peripheral reinforcing flange 31 of the fiberizing spinner 23 where it combusts to add heat to a region over and adjacent the fiberizing spinner including the annular heat bath region 35) and no external burner, could use oxygen introduced or injected into the annular heat bath region 35 from an annular oxygen supply manifold 46 having a continuous annular slit, a series of annularly spaced-apart discrete jets, or a series of annularly spaced-apart slits (semi continuous slits) 47 to carry out the method of the subject invention. Thus, the invention is not intended to be limited to the specific embodiments disclosed, but is to be limited only by the claims appended hereto.

What is claimed is:

1. A method of reducing carbon monoxide and hydrocarbon emissions in a rotary glass fiberization process without degrading the insulating properties of a fibrous product produced by the rotary glass fiberization process, comprising:

introducing molten glass into an interior of a fiberizing spinner of a rotary glass fiberizing apparatus radially inward of an annular peripheral sidewall of the fiberizing spinner; the fiberizing spinner having a disc shaped base and annular peripheral sidewall extending upward from a peripheral edge of the base; the annular peripheral sidewall having a mid-portion extending between an upper annular edge portion and a lower annular edge portion; the mid-portion of the sidewall having thousands of glass fiberization holes therein through which molten glass is passed to form primary glass fibers that are introduced into an annular heat bath region formed by gases of combustion and extending from the upper edge portion down through the mid-portion of the annular sidewall of the fiberizing spinner and radially outward from the sidewall of the fiberizing spinner substantially to an annular fluid attenuation region;

passing the molten glass through the glass fiberization holes in the annular peripheral sidewall of the fiberizing spinner by centrifugal force to form the primary glass fibers and to pass the primary glass fibers through the annular heat bath region into the annular fluid attenuation region;

heating the annular heat bath region with external burner means with gases of combustion to provide a net heat flux into the primary glass fibers passing through the annular heat bath region wherein the heating includes introducing oxygen into the annular heat bath region to oxygen enrich the annular heat bath region and combusting the introduced oxygen in the annular heat bath region to obtain a relatively high localized temperature increase, for reducing primary glass fiber viscosity prior to introducing the primary fibers into the annular attenuation region to be subjected to high rates of shear an attenuating fluid from an attenuation fluid emitting means that attenuates the primary glass fibers into the lesser diameter glass fibers and to reduce carbon monoxide and unburned hydrocarbon emissions produced by the process;

introducing at least part of the oxygen into the annular heat bath region to oxygen enrich the annular heat bath region from an oxygen emitting means that emits into the annular heat bath region, by volume, predominantly oxygen and is separate from the external burner means; and attenuating the primary glass fibers with the attenuating fluid to form the lesser diameter glass fibers.

2. The method of reducing carbon monoxide and hydrocarbon emissions in a rotary glass fiberization process according to claim 1, comprising:

dispensing an oxygen deficient fuel mixture having less oxygen than required for full combustion of the fuel mixture into the interior of the fiberizing spinner and heating the interior of the fiberizing spinner through partial combustion of the fuel mixture within the fiberizing spinner and, by fuel of the oxygen deficient fuel mixture spilling over the annular peripheral sidewall of the fiberizing spinner into the annular heat bath region, heating the annular heat bath region through combustion of the fuel of the oxygen deficient fuel mixture in the annular heat bath region wherein the combustion of the spilled over fuel is enhanced by oxygen of the oxygen enriched, annular heat bath region to materially reduce carbon monoxide and unburned hydrocarbon emissions produced by the process.

3. The method of reducing carbon monoxide and hydrocarbon emissions in a rotary glass fiberization process according to claim 2, wherein:

the oxygen emitting means for introducing at least part of the oxygen into the annular heat bath region to oxygen enrich the annular heat bath region is located above the annular heat bath region and closer to the axis of spinner rotation than the attenuation fluid emitting means.

4. The method of reducing carbon monoxide and hydrocarbon emissions in a rotary glass fiberization process according to claim 3, comprising:

containing heat within the annular heat bath region and the annular fluid attenuation region with barrier means that extends over the annular heat bath region and the annular fluid attenuation region and downward, radially outward from the spinner axis of rotation relative to the annular fluid attenuation region, to substantially enclose the annular heat bath and the annular fluid attenuation regions from both above and outside the annular heat bath and the annular fluid attenuation regions.

5. The method of reducing carbon monoxide and hydrocarbon emissions in a rotary glass fiberization process according to claim 1, wherein:

the oxygen emitting means for introducing at least part of the oxygen into the annular heat bath region to oxygen enrich the annular heat bath region is located above the annular heat bath region and closer to the axis of spinner rotation than the attenuation fluid emitting means.

6. The method of reducing carbon monoxide and hydrocarbon emissions in a rotary glass fiberization process according to claim 5, comprising:

containing heat within the annular heat bath region and the annular fluid attenuation region with barrier means that extends over the annular heat bath region and the annular fluid attenuation region and downward, radially outward from the spinner axis of rotation relative to the annular fluid attenuation region, to substantially enclose the annular heat bath and the annular fluid attenuation regions from both above and outside the annular heat bath and the annular fluid attenuation regions.

7. A method of reducing carbon monoxide and hydrocarbon emissions in a rotary glass fiberization process without degrading the insulating properties of a fibrous product produced by the rotary glass fiberization process, comprising:

introducing molten glass into an interior of a fiberizing spinner of a rotary glass fiberizing apparatus radially inward of an annular peripheral sidewall of the fiberizing spinner; the fiberizing spinner having a disc shaped base and annular peripheral sidewall extending upward from a peripheral edge of the base; the annular peripheral sidewall having a mid-portion extending between an upper annular edge portion and a lower annular edge portion; the mid-portion of the sidewall having thousands of glass fiberization holes therein through which molten glass is passed to form primary glass fibers that are introduced into an annular heat bath region formed by gases of combustion and extending from the upper edge portion down through the mid-portion of the annular sidewall of the fiberizing spinner and radially outward from the sidewall of the fiberizing spinner substantially to an annular fluid attenuation region;

passing the molten glass through the glass fiberization holes in the annular peripheral sidewall of the fiberizing spinner by centrifugal force to form the primary glass fibers and to pass the primary glass fibers through the annular heat bath region into the annular fluid attenuation region;

heating the annular heat bath region with gases of combustion to provide a net heat flux into the primary glass fibers passing through the annular heat bath region wherein the heating includes introducing oxygen into the annular heat bath region to oxygen enrich the annular heat bath region and combusting the introduced oxygen in the annular heat bath region to obtain a relatively high localized temperature increase, for reducing primary glass fiber viscosity prior to introducing the primary fibers into the annular attenuation region to be subjected to high rates of shear by an attenuating fluid from an attenuation fluid emitting means that attenuates the primary glass fibers into the lesser diameter glass fibers and to reduce carbon monoxide and unburned hydrocarbon emissions produced by the process; attenuating the primary glass fibers with the attenuating fluid to form the lesser diameter glass fibers;

utilizing an external burner means for heating the annular heat bath region which comprises a combustion chamber; and introducing at least part of the oxygen into the annular heat bath region to oxygen enrich the annular heat bath region by introducing an oxygen rich fuel mixture into the combustion chamber of the external burner means, combusting the oxygen rich fuel mixture within the combustion chamber of the external burner means, and discharging the products of combustion and residual noncombusted oxygen from the external burner means into the annular heat bath region; and introducing at least part of the oxygen into the annular heat bath region to oxygen enrich the annular heat bath region from an oxygen emitting means that emits into the annular heat bath region, by volume, predominantly oxygen and is separate from the external burner means.

8. The method of reducing carbon monoxide and hydrocarbon emissions in a rotary glass fiberization process according to claim 7, comprising:

dispensing an oxygen deficient fuel mixture having less oxygen than required for full combustion of the fuel mixture into the interior of the fiberizing spinner and heating the interior of the fiberizing spinner through partial combustion of the fuel mixture within the fiberizing spinner and, by fuel of the oxygen deficient fuel mixture spilling over the annular peripheral sidewall of the fiberizing spinner into the annular heat bath region, heating the annular heat bath region through combustion of the fuel of the oxygen deficient fuel mixture in the annular heat bath region wherein the combustion of the spilled over fuel is enhanced by oxygen of the oxygen enriched, annular heat bath region to materially reduce carbon monoxide and unburned hydrocarbon emissions produced by the process.

9. The method of reducing carbon monoxide and hydrocarbon emissions in a rotary glass fiberization process according to claim 7, wherein:

the oxygen emitting means for introducing at least part of the oxygen into the annular heat bath region to oxygen enrich the annular heat bath region is located above the annular heat bath region and closer to the axis of spinner rotation than the attenuation fluid emitting means.

10. The method of reducing carbon monoxide and hydrocarbon emissions in a rotary glass fiberization process according to claim 9, comprising:

containing heat within the annular heat bath region and the annular fluid attenuation region with barrier means that extends over the annular heat bath region and the annular fluid attenuation region and downward, radially outward from the spinner axis of rotation relative to the annular fluid attenuation region, to substantially enclose the annular heat bath and the annular fluid attenuation regions from both above and outside the annular heat bath and the annular fluid attenuation regions.

11. A method of reducing carbon monoxide and hydrocarbon emissions in a rotary glass fiberization process without degrading the insulating properties of a fibrous product produced by the rotary glass fiberization process, comprising:

introducing molten glass into an interior of a fiberizing spinner of a rotary glass fiberizing apparatus radially inward of an annular peripheral sidewall of the fiberizing spinner; the fiberizing spinner having a disc shaped base and annular peripheral sidewall extending upward from a peripheral edge of the base; the annular peripheral sidewall having a mid-portion extending between an upper annular edge portion and a lower annular edge portion; the mid-portion of the sidewall having thousands of glass fiberization holes therein through which molten glass is passed to form primary glass fibers that are introduced into an annular heat bath region formed by gases of combustion and extending from the upper edge portion down through the mid-portion of the annular sidewall of the fiberizing spinner and radially outward from the sidewall of the fiberizing spinner substantially to an annular fluid attenuation region;

passing the molten glass through the glass fiberization holes in the annular peripheral sidewall of the fiberizing spinner by centrifugal force to form the primary glass fibers and to pass the primary glass fibers through the annular heat bath region into the annular fluid attenuation region;

heating the annular heat bath region with gases of combustion to provide a net heat flux into the primary glass fibers passing through the annular heat bath region wherein the heating includes introducing oxygen into the annular heat bath region to oxygen enrich the annular heat bath region and combusting the introduced oxygen in the annular heat bath region to obtain a relatively high localized temperature increase, for reducing primary glass fiber viscosity prior to introducing the primary fibers into the annular attenuation region to be subjected to high rates of shear by an attenuating fluid from an attenuation fluid emitting means that attenuates the primary glass fibers into the lesser diameter glass fibers and to reduce carbon monoxide and unburned hydrocarbon emissions produced by the process;

attenuating the primary glass fibers with the attenuating fluid to form the lesser diameter glass fibers;

utilizing an external burner means for heating the annular heat bath region wherein the combustion of a fuel mixture introduced into the external burner means takes place externally of the external burner means; and introducing the oxygen into the annular heat bath region to oxygen enrich the annular heat bath region from an oxygen emitting means that emits into the annular heat bath region, by volume, predominantly oxygen and is separate from the external burner means.

12. The method of reducing carbon monoxide and hydrocarbon emissions in a rotary glass fiberization process according to claim 11, comprising:

dispensing an oxygen deficient fuel mixture having less oxygen than required for full combustion of the fuel mixture into the interior of the fiberizing spinner and heating the interior of the fiberizing spinner through partial combustion of the fuel mixture within the fiberizing spinner and, by fuel of the oxygen deficient fuel mixture spilling over the annular peripheral sidewall of the fiberizing spinner into the annular heat bath region, heating the annular heat bath region through combustion of the fuel of the oxygen deficient fuel mixture in the annular heat bath region wherein the combustion of the spilled over fuel is enhanced by oxygen of the oxygen enriched, annular heat bath region to materially reduce carbon monoxide and unburned hydrocarbon emissions produced by the process.

13. The method of reducing carbon monoxide and hydrocarbon emissions in a rotary glass fiberization process according to claim 11, wherein:

the oxygen emitting means for introducing the oxygen into the annular heat bath region to oxygen enrich the annular heat bath region is located above the annular heat bath region and closer to the axis of spinner rotation than the attenuation fluid emitting means.

14. The method of reducing carbon monoxide and hydrocarbon emissions in a rotary glass fiberization process according to claim 13, comprising:

containing heat within the annular heat bath region and the annular fluid attenuation region with barrier means that extends over the annular heat bath region and the annular fluid attenuation region and downward, radially outward from the spinner axis of rotation relative to the annular fluid attenuation region, to substantially enclose the annular heat bath and the annular fluid attenuation regions from both above and outside the annular heat bath and the annular fluid attenuation regions.

* * * * *